United States Patent [19]
Ikesugi et al.

[11] Patent Number: 5,751,876
[45] Date of Patent: May 12, 1998

[54] OPTICAL FIBER CABLE CONNECTOR

[75] Inventors: Hiroshi Ikesugi, Yokohama; Shigeyuki Hoshikawa, Yamato, both of Japan

[73] Assignee: Molex Incorporated, Lisle, Ill.

[21] Appl. No.: 676,691

[22] Filed: Jul. 10, 1996

[30] Foreign Application Priority Data

Aug. 24, 1995 [JP] Japan ................... 7-009812

[51] Int. Cl.⁶ ........................................ G02B 6/36
[52] U.S. Cl. ...................... 385/86; 385/59; 385/137
[58] Field of Search ........................ 385/59, 66, 67, 385/68, 69, 86, 87, 136, 137

[56] References Cited

U.S. PATENT DOCUMENTS

| | | | |
|---|---|---|---|
| 3,871,744 | 3/1975 | Bridger et al. | 350/96 C |
| 4,309,071 | 1/1982 | Prunier | 350/96.21 |
| 5,271,080 | 12/1993 | Hopper et al. | 385/76 |
| 5,450,514 | 9/1995 | Hotea et al. | 385/87 |
| 5,509,093 | 4/1996 | Miller et al. | 385/27 |

FOREIGN PATENT DOCUMENTS

| | | | |
|---|---|---|---|
| 0626602 A1 | 11/1994 | European Pat. Off. | G02B 6/36 |
| 4008923 A1 | 9/1991 | Germany | G02B 6/36 |
| 1-120511 | 5/1989 | Japan | 385/86 |
| 2251917 | 9/1990 | Japan | G02B 6/36 |
| 5060944 | 12/1993 | Japan | G02B 6/36 |

*Primary Examiner*—John Ngo
*Attorney, Agent, or Firm*—A. A. Tirva

[57] ABSTRACT

Disclosed is an improved optical fiber cable connector including a housing having a through hole to permit insertion of an end of an optical fiber cable, and a retaining portion to fix the optical fiber cable within the housing. The retaining portion is integrally connected to the housing in such a way that it may be yieldingly sheared and separated from the housing when pressed down, thus permitting the retaining portion to enter the through hole of the housing and engage the optical fiber cable within the housing.

3 Claims, 3 Drawing Sheets

5,751,876

OPTICAL FIBER CABLE CONNECTOR

FIELD OF THE INVENTION

The present invention relates to optical fiber cable connectors used in interconnecting optical fiber cables by abutting the cable ends.

PRIOR ART

As is well known, such type optical fiber connector includes a housing having at least one through hole to permit insertion of an end of an optical fiber cable, and a retaining portion to fix the optical fiber cable in the housing. The housing and the retaining portion are made as separate pieces. After inserting the end of the optical fiber cable into the through hole of the housing, the retaining portion is applied to the housing to hold the cable in position in the housing, as is shown in Japanese Patent Application Public Disclosure 5-60944, Utility Model Application Publication No. 62-17772, Utility Model Application Publication No. 6-24802 and others.). Usually retaining portions are designed to be coupled directly to the housing. In some cases, however, holding pieces are designed to be coupled indirectly to the housing by using extra intervening members, as shown for instance, in Japanese Utility Model Application Publication No. 5-38609.

As mentioned above, typically a housing and an associated retaining portion are made as separate pieces. This adds to the number of connector parts complicating the manufacturing and assembly. An additional disadvantage is that aligning of separate parts is required when attaching optical fiber cables to the connector.

SUMMARY OF THE INVENTION

One object of the present invention is to provide an optical fiber cable connector which is composed of the least number of parts and facilitates the attaching of the ends of optical fiber cables to the connector.

To attain this object an optical fiber cable connector, which includes a housing having at least one through hole to permit insertion of an end of an optical fiber cable and an associated retaining portion to fix the optical fiber cable in the housing, is improved according to the present invention in that the retaining portion is integrally connected to the housing in such a way that it may be sheared and separated when from the housing when being pressed down during termination, thus permitting the retaining portion to enter the through hole of the housing and engage the optical fiber cable.

The retaining portion may have projections formed on its opposite sides and the through hole may have recesses formed on its opposite sides thereby permitting the locking of the retaining portion in the housing when the projections of the retaining portion are mated with the recesses of the through hole of the housing.

The retaining portion may be an inverted "U"-shaped block having projecting edges on its opposite legs extending in opposite directions transverse to the direction in which the optical fiber cable extends through the through hole of the housing.

Other objects and advantages of the present invention will be understood from the following description of an optical fiber cable connector according to a preferred embodiment of the present invention, which is shown in accompanying drawings.

DETAILED DESCRIPTION OF THE PREFERRED EMBODIMENTS

Figure 5:
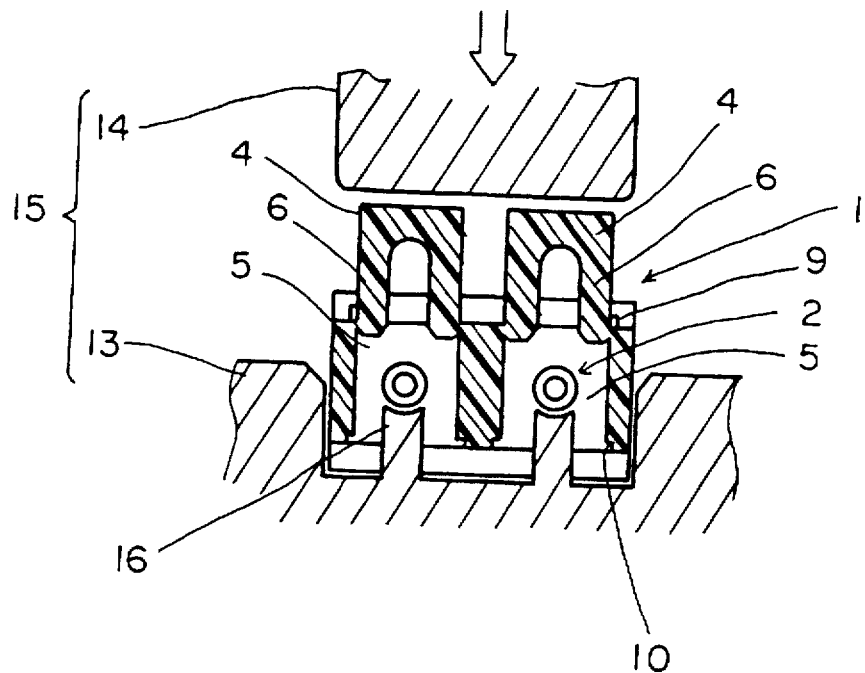
FIG. 5 shows, in section, how the retaining portions are pushed into the through holes of the housing to hold the terminal ends of the optical fiber cables in the housing.

Referring to the drawings, an optical fiber cable connector 1 comprises a plastic housing 3 having two through holes 5 to permit insertion of ends 2a of the two optical fiber cables 2, and associated retaining portions 4 to fix the optical fiber cables 2 in the housing 3. Specifically, the housing 3 has two through holes 5 extending from its front 3a to rear side 3b, and two retaining portions 4 positioned across the through holes 5, as best seen in FIG. 5.

Figure 3:
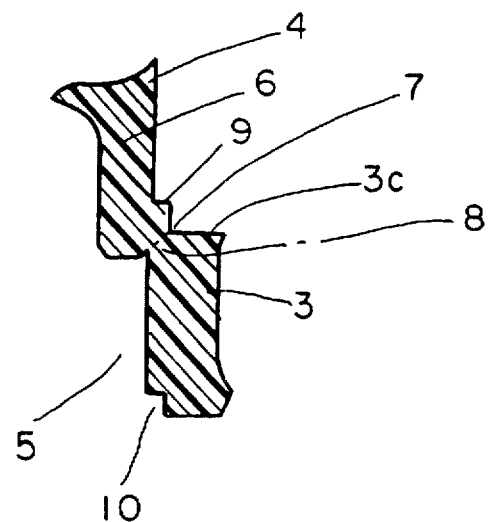
FIG. 3 is an enlarged sectional view of the section between the connector housing and the retaining portion.

Each retaining portion 4 has the same width and height as the through hole 5, and has an inverted "U"-shape in cross section. As seen from FIGS. 3 and 5, the opposite legs 6 of the inverted "U"-shaped block 4 are connected to the upper surface 3c of the housing 3 via frangible portions 7. When the inverted "U"-shaped retaining portion 4 is depressed, the frangible portions 7 will be sheared along the broken line 8 in FIG. 3, so that the retaining portion 4 is press-fitted into the through hole 5 engaging the optical fiber cable 2 in the housing 3.

The retaining portion 4 has projections 9 formed on its opposite sides, particularly on the lower, outer surface of the opposite legs 6 of the inverted "U"-shape. The opposite walls defining the through hole 5 have recesses 10 formed on their lower ends. When the retaining portion 4 is depressed and press-fitted in the through hole 5, it will be locked to the housing when its projections 9 are positioned in the recesses 10 of the opposite walls of the housing 3.

Figure 4:
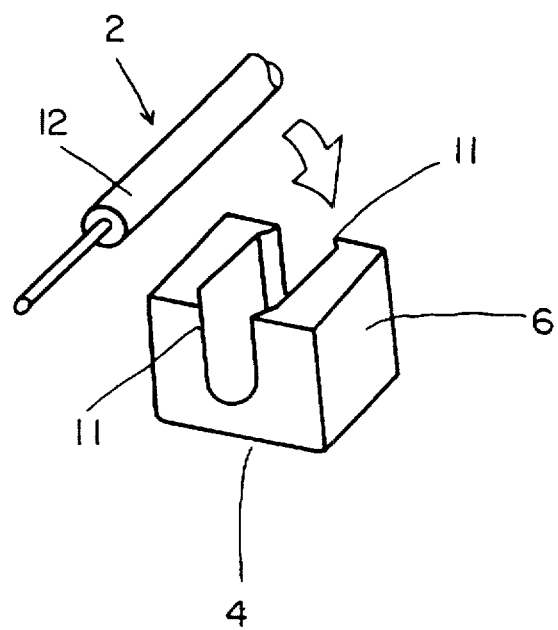
FIG. 4 is a perspective view of the retaining portions in an inverted position.

Also, as shown in FIG. 4, the inverted "U"-shaped retaining portion 4 has projecting edges 11 on its opposite legs 6, extending inside in opposite directions. When an optical fiber cable 2 is inserted into through hole 5, and when retaining portion 4 is depressed and pushed into the through hole 5, its projecting edges 11 will grip the jacket 12 of the optical fiber cable 2, thus firmly attaching the cable 2 to the housing 1.

Figure 1:
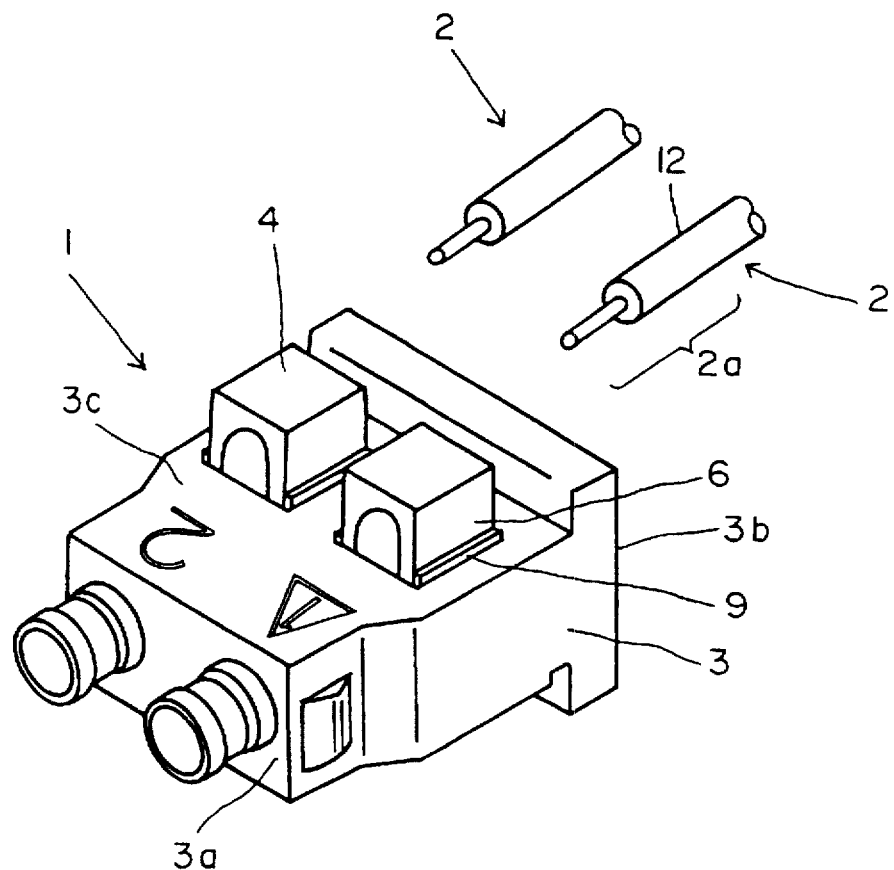
FIG. 1 is perspective view of an optical fiber cable connector and two optical fiber cables.
Figure 2:
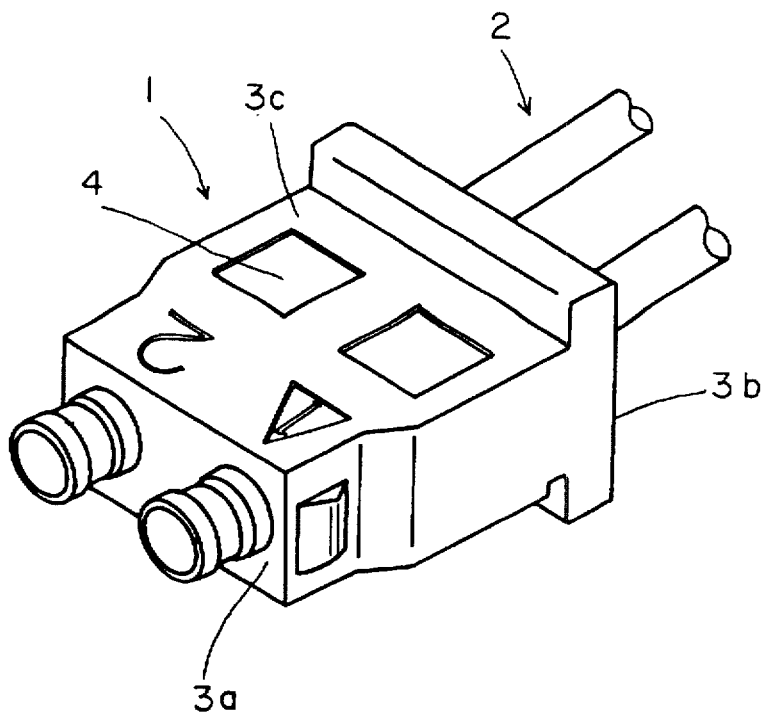
FIG. 2 is a similar perspective view of the optical fiber cable connector, but showing the ends of the optical fiber cables fixed therein.
Figure 6:
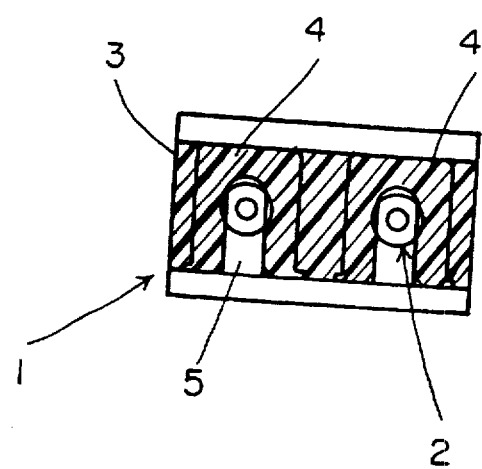
FIG. 6 shows, in section, how the ends of the optical fiber cables are held in the housing.

When an optical fiber cable 2 is attached to the connector 1, a jig 15 including a stand 13 and a pusher 14 is used. As seen from FIG. 5, the stand 13 has a recess in its top surface. The recess is counter-sunk relative to the inverted "W"-shape of the connector 1, and has two projections 16 to support optical fiber cables 2 thereon. The connector 1 is placed on the stand 13, and the optical fiber cables 2 are inserted through holes 5 to lie on the projections 16 of the stand 13. Then, the retaining portions 4 are pushed down with the aid of the pusher 14, thereby shearing the frangible portions 7 and pushing the retaining portions 4 into the through holes 5, as seen in FIG. 6. This final position of retaining portions is shown in FIG. 2 wherein the retaining portions 4 are flush with the top surface 3c of the housing 3. As described above, the projections 9 of each holding block 4 are received in the recesses 10 of the housing 4, and at the same time, the projection edges 11 of the retaining portion 4 engage the jacket 2a of the optical fiber cable 2. Due to the projections 16 of the stand 13, the retaining portions 4 hold the optical cables 2 in predetermined positions within the connector housing.

As may be understood from the above, the two retaining portions 4 are connected to the housing 3 via frangible portions 7 and therefore, the connector may be made and handled as a whole. Also, advantageously it suffices that the retaining portions 4 are pushed into the through holes 5 of the housing 13 to attach the optical fiber cables 2 to the connector without the necessity of having to position the retaining portions 4 relative to the housing 3, thus facilitating the attaching of the optical fiber cables to the connector.

The retaining portions 4 may be locked to the housing 3 with the projections 9 of the holding blocks 4 fitted in the recesses 10 of the housing 3, requiring no extra locking means. Accordingly, the number of parts to assemble and terminate an optical fiber cable connector is reduced. The engagement between a retaining portion 4 and the optical fiber cable is accomplished by the projection edges 11 of the retaining portion 4 without recourse to extra separate parts. Accordingly the number of parts is reduced.

We claim:

1. An optical fiber connector comprising, a housing molded of a dielectric material, the housing having at least one through hole extending along a first axis to permit insertion of an end of an optical fiber, and at least one opening extending along a second axis generally perpendicular to said first axis to communicate with the through hole, and a cable retaining portion positioned in the opening, the retaining portion molded with the housing and connected to the housing by at least one frangible portion.

2. An optical fiber cable connector according to claim 1, wherein the retaining portion has projections formed on its opposite sides, and the housing has recesses formed on opposite sides of the through hole whereby the retaining portion is locked to the housing when the projections of the retaining portions enter the recesses of the through hole of the housing.

3. An optical fiber cable connector according to claim 1 or 2 wherein the retaining portion is an inverted "U"-shaped block having two leg portions having edges extending in opposite directions transverse to the direction in which the optical fiber cable extends through the through hole of the housing.

* * * * *